US012639291B2

(12) United States Patent
McHugh et al.

(10) Patent No.: US 12,639,291 B2
(45) Date of Patent: *May 26, 2026

(54) MULTIPLE INDEX SCANS

(71) Applicant: Salesforce, Inc., San Francisco, CA (US)

(72) Inventors: Colm McHugh, Dublin (IE); Rama K. Korlapati, El Segundo, CA (US); Yi Xia, Los Angeles, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/025,385

(22) Filed: Jan. 16, 2025

(65) Prior Publication Data

US 2025/0156403 A1 May 15, 2025

Related U.S. Application Data

(63) Continuation of application No. 17/646,477, filed on Dec. 29, 2021, now Pat. No. 12,229,119.

(51) Int. Cl.
G06F 16/23 (2019.01)
(52) U.S. Cl.
CPC ................................ G06F 16/2379 (2019.01)
(58) Field of Classification Search
None
See application file for complete search history.

(56) References Cited

U.S. PATENT DOCUMENTS 6,081,799 A * 6/2000 Beavin .............. G06F 16/24557
6,647,386 B2 11/2003 Hollines, III et al.

| | | | |
|---|---|---|---|
| 6,934,796 B1 * | 8/2005 | Pereira ................... G11C 15/00 | |
| | | | 711/108 |
| 7,836,036 B2 | 11/2010 | Bhattacharjee et al. | |
| 7,925,656 B2 | 4/2011 | Liu et al. | |
| 9,043,310 B2 | 5/2015 | Liu et al. | |
| 11,449,499 B1 | 9/2022 | Alsaadi et al. | |
| 2005/0177544 A1 * | 8/2005 | Wigger ................... H04L 63/02 | |
| 2009/0182724 A1 * | 7/2009 | Day ..................... G06F 16/2453 | |
| | | | 707/999.005 |
| 2009/0228514 A1 | 9/2009 | Liu et al. | |
| 2012/0209873 A1 * | 8/2012 | He ....................... G06F 16/2237 | |
| | | | 707/769 |
| 2021/0406251 A1 * | 12/2021 | Kläbe ................. G06F 16/2379 | |

\* cited by examiner

*Primary Examiner* — Richard L Bowen

(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to implementing multiple index scans. A computer system may store a database table comprising fields and indexes corresponding to those fields. The computer system may receive a request to access records based on a Boolean expression that affects a selection of records from the database table and that comprises clauses, at least two of which are joined by an AND operation. The computer system may access the requested records. The accessing may include, for a given one of the at least two clauses, performing an index scan on an index that corresponds to the given clause to identify records that satisfy that clause. The computer system may update a hash table based on the identified records and then identify the requested records based on the hash table. The Boolean expression may include clauses joined by an OR operation that are processed using multiple index scans.

16 Claims, 9 Drawing Sheets

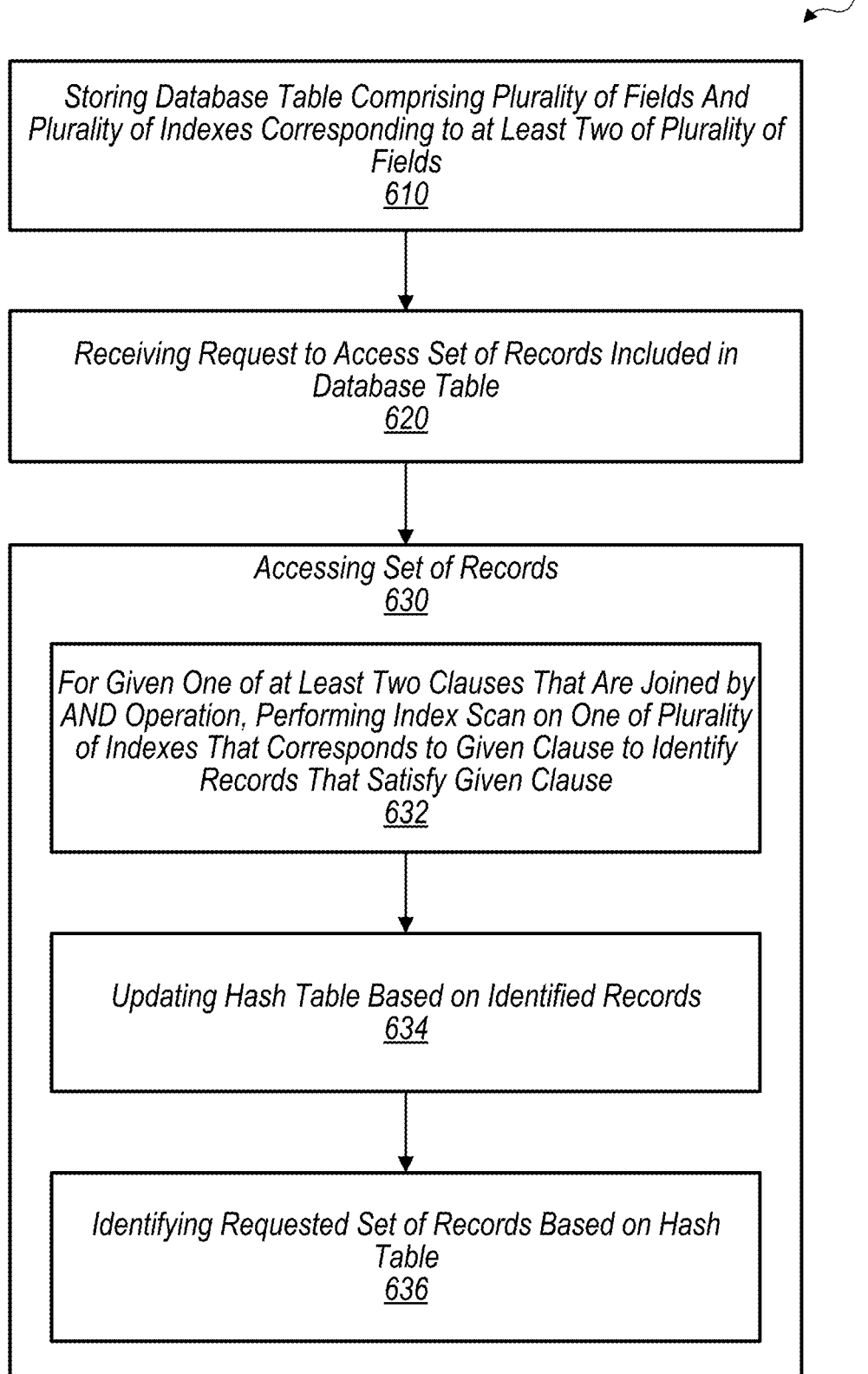

*600*

Storing Database Table Comprising Plurality of Fields And Plurality of Indexes Corresponding to at Least Two of Plurality of Fields
610

Receiving Request to Access Set of Records Included in Database Table
620

Accessing Set of Records
630

For Given One of at Least Two Clauses That Are Joined by AND Operation, Performing Index Scan on One of Plurality of Indexes That Corresponds to Given Clause to Identify Records That Satisfy Given Clause
632

Updating Hash Table Based on Identified Records
634

Identifying Requested Set of Records Based on Hash Table
636

Storing Plurality of Records in Database Table
710

Storing Plurality of Indexes Built on Fields of Database Table
720

Receiving Request to Access Set of Records Included Within
Database Table
730

Accessing, Without Using Bitmaps, Set of Records Using Ones of
Plurality of Indexes That Correspond to Plurality of Clauses of
Boolean Expression
740

MULTIPLE INDEX SCANS

The present application is a continuation of U.S. application Ser. No. 17/646,477, entitled "MULTIPLE INDEX SCANS," filed Dec. 29, 2021, the disclosure of which is incorporated by reference herein in its entirety.

BACKGROUND

Technical Field

This disclosure relates generally to database systems and, more specifically, to various mechanisms for implementing database accesses using multiple index scans.

Description of the Related Art

Enterprises routinely implement database management systems (or, simply "database systems") that enable users to store a collection of information in an organized manner that can be efficiently accessed and manipulated. The information is often stored in database tables that comprise rows and columns, in which each column defines a grouping of that information. To access information from a database table, a client can issue a request, in the form of a database query, for that information. A query typically specifies criteria for selecting records of the table to be manipulated and/or returned to the requestor. But the database table may be organized in such a manner that it is difficult to efficiently identify the records that satisfy the criteria of the query. In order to improve the execution time of queries against a table, indexes are often built based on columns/fields of the table, where the indexes organize a portion of the data stored in the table in a different manner.

BRIEF DESCRIPTION OF THE DRAWINGS

FIG. 6-7 are flow diagrams illustrating example methods relating to processing a query using multiple indexes, according to some embodiments.

DETAILED DESCRIPTION

Figure 1:
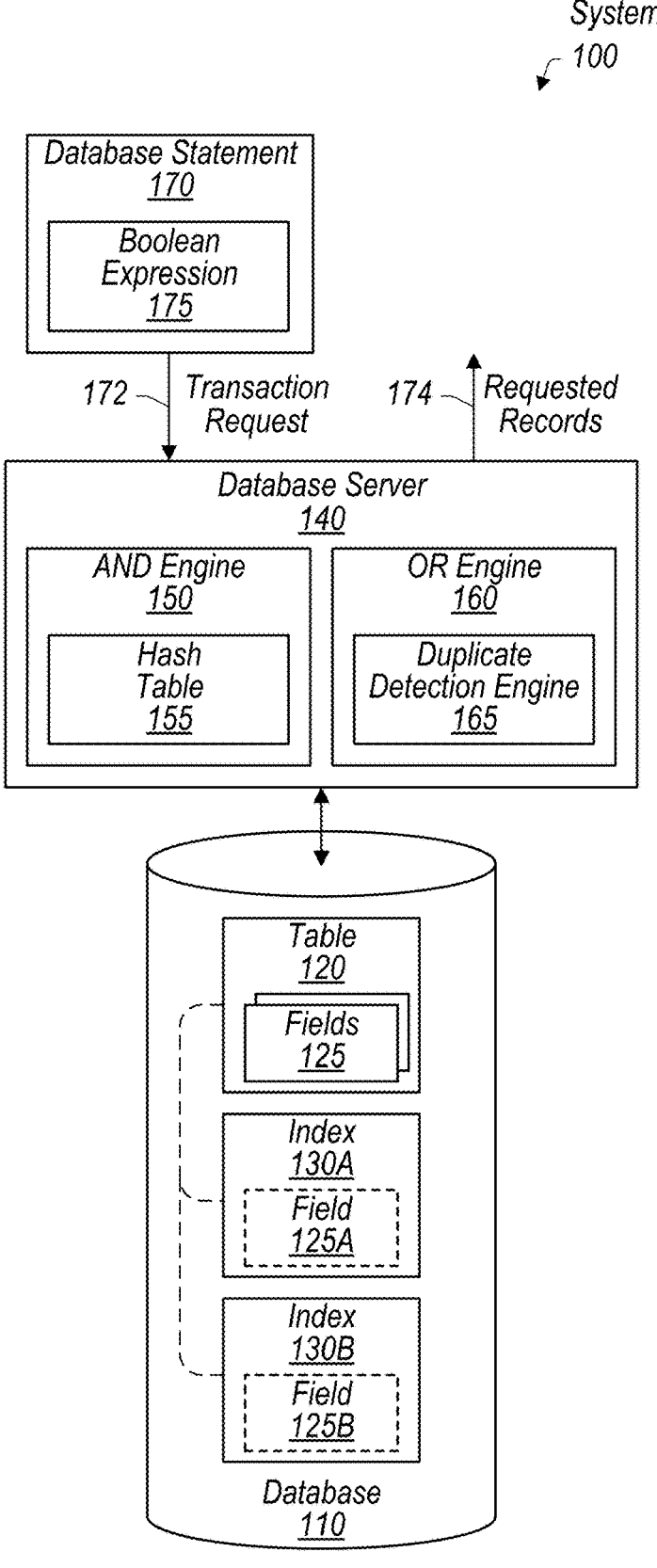
FIG. 1 is a block diagram illustrating example elements of a system having a database server and a database that stores multiple indexes created based on a table, according to some embodiments.

When a client (e.g., an application node) seeks to access data stored in a database table, the client typically issues a request to the database system that manages that table. The request can specify a query having multiple conditions that affect a selection of the data to be returned and/or manipulated. To process the query in a more efficient manner, in some implementations, the database system processes the query using multiple indexes built on the database table that correspond to the multiple conditions of the query. One conventional approach that allows for multiple indexes to be used to process a query is the bitmap index scan. In particular, an index can store key-value pairs comprising a secondary key (on which the index is built) and a value, such as a row identifier, that can be used to access the row/record corresponding to the key. In a bitmap index scan of an index that corresponds to one of the conditions of the query, a bitmap is created where each bit in the bitmap corresponds to a row/system identifier. When an entry of the index satisfies the relevant condition, the bit corresponding to the row identifier of that entry is set. A bitmap index scan is performed for each condition of the query and the resulting bitmaps are ANDed or ORed (based on the Boolean expression connecting two conditions) to identify the requested records. But in some database implementations, the records of a database table are not associated with a row/system identifier and thus the bitmap index scan approach is not feasible as it relies on row identifiers. This disclosure addresses, among other things, the problem of how to use multiple indexes to process a query without row identifiers and bitmaps.

In various embodiments that are described below, a system includes a database table having fields, and indexes that are built based on one or more of those fields. In various cases, the system receives a request specifying a Boolean expression that affects a selection of records from the database table. The Boolean expression can comprise multiple clauses that are joined by AND operations and/or OR operations. The system processes that request to access records that satisfy the clause(s) of the Boolean expression. To process clauses that are joined by a set of AND operations, in various embodiments, the system performs, for each clause, an index scan in which an index corresponding to that clause is scanned in order to identify records that satisfy the condition of the clause. The system may update a hash table (e.g., increment counter values) based on the records that are identified from those index scans. Thereafter, the system may return or manipulate records that are selected based on the information (e.g., count values) of the hash table. To process clauses joined by a set of OR operations, in various embodiments, the system performs an index scan for each clause and then constructs a union of the results of those index scans. The system may thereafter remove duplicate records from the union result. In some embodiments, the system uses the primary keys of those records to identify duplicate records. In other embodiments, the system applies a filter to the records in order to identify the duplicate records so that they can be removed.

These techniques may be advantageous over prior approaches as these techniques allow multiple indexes to be used to execute a query in a database implementation that does not use row/system identifiers. These techniques may further provide improved scan time as scanning from indexes when the predicates are highly selective can greatly reduce the amount of data to read. Moreover, these techniques may provide improved latency compared to a full table scan for OR clauses, because the latency can be the latency of the first index scan that is a part of the union operation. While the improved latency can also apply to a bitmap index scan for OR clauses, in the bitmap index scan for OR clauses, the bitmap for each sub-clause must be fully constructed before results can be returned. However, using the OR approach discussed below with respect to FIG. 3, when the first result in the first index scan has been obtained, it can be returned to the client without waiting for the remaining results. Additionally, since there are fewer expression executions, the overall query execution time can be reduced. An exemplary application of the techniques of this disclosure will now be discussed, starting with reference to FIG. 1.

Turning now to FIG. 1, a block diagram of a system 100 is shown. System 100 includes a set of components that may be implemented via hardware or a combination of hardware and software routines. Within the illustrated embodiment, system 100 includes a database 110 and a database server 140. As shown, database 110 includes a table 120 having fields 125, an index 130A based on a field 125A of table 120, and an index 130B based on a field 125B of table 120. As further illustrated, database server 140 includes an AND engine 150 associated with a hash table 155 and an OR engine 160 comprising a duplicate detection engine 165. In some embodiments, system 100 may be implemented differently than shown. For example, system 100 may include multiple database servers 140 that interact with database 110, database 110 may store records for multiple tables 120, and more or less indexes 130 may be built on table 120.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases (e.g., database 110), and entities (e.g., a third-party system) relating to system 100. In various embodiments, system 100 is implemented using a cloud infrastructure provided by a cloud provider. Database 110 and database server 140 may thus execute on and utilize the available cloud resources of that cloud infrastructure (e.g., computing resources, storage resources, network resources, etc.) in order to facilitate their operation. For example, database server 140 may execute in a virtual environment hosted on server-based hardware included in a datacenter of the cloud provider. But in some embodiments, system 100 is implemented utilizing a local or private infrastructure as opposed to a public cloud.

Database 110, in various embodiments, is a collection of information that is organized in a manner that allows for access, storage, and/or manipulation of that information. Database 110 may include supporting software (e.g., storage servers) that enable database server 140 to carry out those operations (e.g., accessing, storing, etc.) on the information stored at database 110. In various embodiments, database 110 is implemented using a single or multiple storage devices that are connected together on a network (e.g., a storage attached network (SAN)) and configured to redundantly store information in order to prevent data loss. The storage devices may store data persistently and thus database 110 may serve as a persistent storage for system 100. In some embodiments, data written to database 110 by a database server 140 is accessible to other database servers 140 within a multi-node configuration. In various embodiments, data is stored at database 110 in records that are included in table 120

Table 120, in various embodiments, is a database object having a set of data records—that set of data records may be an empty set. Table 120 may store data in an organized structure that comprises columns and rows, in which a column defines an attribute/field 125 and a row corresponds to a record that stores one or more values for the columns. A field 125, in various embodiments, provides structure for table 120 and defines a category of data for which records of table 120 may provide a value. For example, a field 125 may correspond to usernames and thus a record of table 120 may include a value for that field 125 that identifies a username. In various embodiments, the records of table 120 can be sorted (e.g., in ascending or descending order) based on one or more fields 125 of table 120. For example, the records of table 120 may be alphabetically sorted based on the usernames that they identify for a username field 125 of table 120. Record accesses/lookups that search for records based on the one or more fields 125 on which table 120 is sorted may be performed more efficiently than record lookups that search for records based on other fields 125. Continuing the previous example, a lookup for a record associated with a particular username may be performed quicker than a lookup that attempts to locate a record associated with a particular city as all records of table 120 might have to be searched in the latter lookup. To improve the efficiency of lookups that involve a different field 125 than the one by which table 120 is sorted, in various embodiments, indexes 130 are created that are sorted according to the different field 125.

Indexes 130, in various embodiments, are built based on one or more fields 125 of table 120. The entries in those indexes 130 are sorted based on the one or more fields 125 and may include a subset or all of the values of their corresponding records in table 120. The subset of values may include enough information that can be used to locate the corresponding record in table 120. Consider an example in which table 120 comprises a username field 125 that serves as a primary key and by which table 120 is sorted. As used herein, the phrase "primary key" is used in accordance with its well-understood meaning and refers to a set of fields that are used to uniquely identify a record from all records of a table. For example, a username field may be designated as the primary key field and therefore usernames can be used to lookup records of a table, where no two usernames map to the same record in that table. Returning to the previous example, table 120 may also comprise a city field 125 and an index 130 may be built based on that city field 125. Instead of storing all the data of table 120, that index 130 may have entries that store, for each entry, a search key value (e.g., a city value) and an associated primary key value (e.g., a username) to the corresponding record. Consequently, a search of that index 130 for records 174 that are associated with a particular city may return a set of primary key values that can be used to locate the actual records in table 120 (in a subsequent search). Queries that are conditioned based on fields 125 by which table 120 is not ordered, in various embodiments are executed against indexes 130. While database tables are discussed, in some embodiments, other database objects may be used (e.g., a document in a non-relational database) and indexes 130 may be created based on those objects.

Database server 140, in various embodiments, provides database services, such as data retrieval, data manipulation, and data storage. In various embodiments, database server

140 is software that is executable on hardware, while in some embodiments, it encompasses both the hardware and the software. The database services may be provided to components internal and external to system 100. As an example, database server 140 may receive a transaction request 172 from an application server to perform a database transaction. A database transaction, in various embodiments, is a logical unit of work (e.g., a specified set of database statements 170) to be performed in relation to database 110. As an example, processing a database transaction may include executing a SQL SELECT statement 170 to select one or more rows of table 120. The contents of a row may be specified in a record and thus database server 140 may return one or more requested records 174 that correspond to those one or more rows.

A database statement 170, in various embodiments, can include a conditional portion comprising a Boolean expression 175 that affects a selection of data. Boolean expression 175 can include clauses that are joined by ANDs, ORs, and/or NOTs (e.g., SELECT*FROM table 120 WHERE age <45 AND city=Austin). Accordingly, records of table 120 may be returned to the requestor only if the records satisfy Boolean expression 175 of database statement 170. In order to process clauses of Boolean expression 175 that are joined by an AND operation or OR operation, database server 140 executes AND engine 150 and OR engine 160. In various embodiments, AND engine 150 and OR engine 160 are executed only if there is an index 130 for each clause of Boolean expression 175.

AND engine 150, in various embodiments, is software that is executable to identify one or more records of table 120 that satisfy a set of clauses joined together by a set of ANDs. For example, Boolean expression 175 may specify an age clause, a city clause, and a gender clause that are joined by a set of ANDs and thus AND engine 150 may return only those records that have values satisfying all three clauses. To identify the records, in various embodiments, AND engine 150 utilizes multiple indexes 130, where each index 130 corresponds to a clause that is being evaluated. In particular, for each clause being evaluated, AND engine 150 may perform an index scan on the index 130 that is built on the field 125 of the clause. For example, a clause may specify that records of table 120 whose age value is less than 50 are to be returned. AND engine 150 may perform an index scan of the index 130 that is built on and ordered according to that age field 125. The index scan may identify records that satisfy the corresponding clause. In various embodiments, AND engine 150 uses a hash table 155 to track records that have been identified in a given index scan. After performing all the appropriate index scans, AND engine 150 may determine, from hash table 155, which records were identified in all those index scans and then may return those records to the requestor or manipulate those records before writing them back to database 110. An AND approach is discussed in greater detail with respect to FIG. 2.

OR engine 160, in various embodiments, is software that is executable to identify one or more records of table 120 that satisfy at least one clause of a set of clauses joined together by a set of ORs. Similarly to AND engine 150, to identify the records, in various embodiments, OR engine 160 uses multiple indexes 130, where each index 130 corresponds to a clause being evaluated. OR engine 160 may perform an index scan for each of the relevant clauses and then union the results of those index scans to identify a set of records to be returned. Then, in various embodiments, OR engine 160 implements duplicate detection engine 165 to remove duplicates to ensure that a record is returned at most once. As discussed in greater detail with respect to FIGS. 3-5, duplicate detection engine 165 may use filters, a hash table, or a sorted list to detect duplicate records so that they can be removed.

AND engine 150 and OR engine 160, in various embodiments, enable database server 140 to process queries with a Boolean expression 175 comprising an arbitrary number of AND and OR clauses. For example, database server 140 may process a Boolean expression 175 such as (clause AND clause) OR clause OR clause. Such a Boolean expression 175 can be processed using multiple indexes without the use of row/system identifiers.

Figure 2:
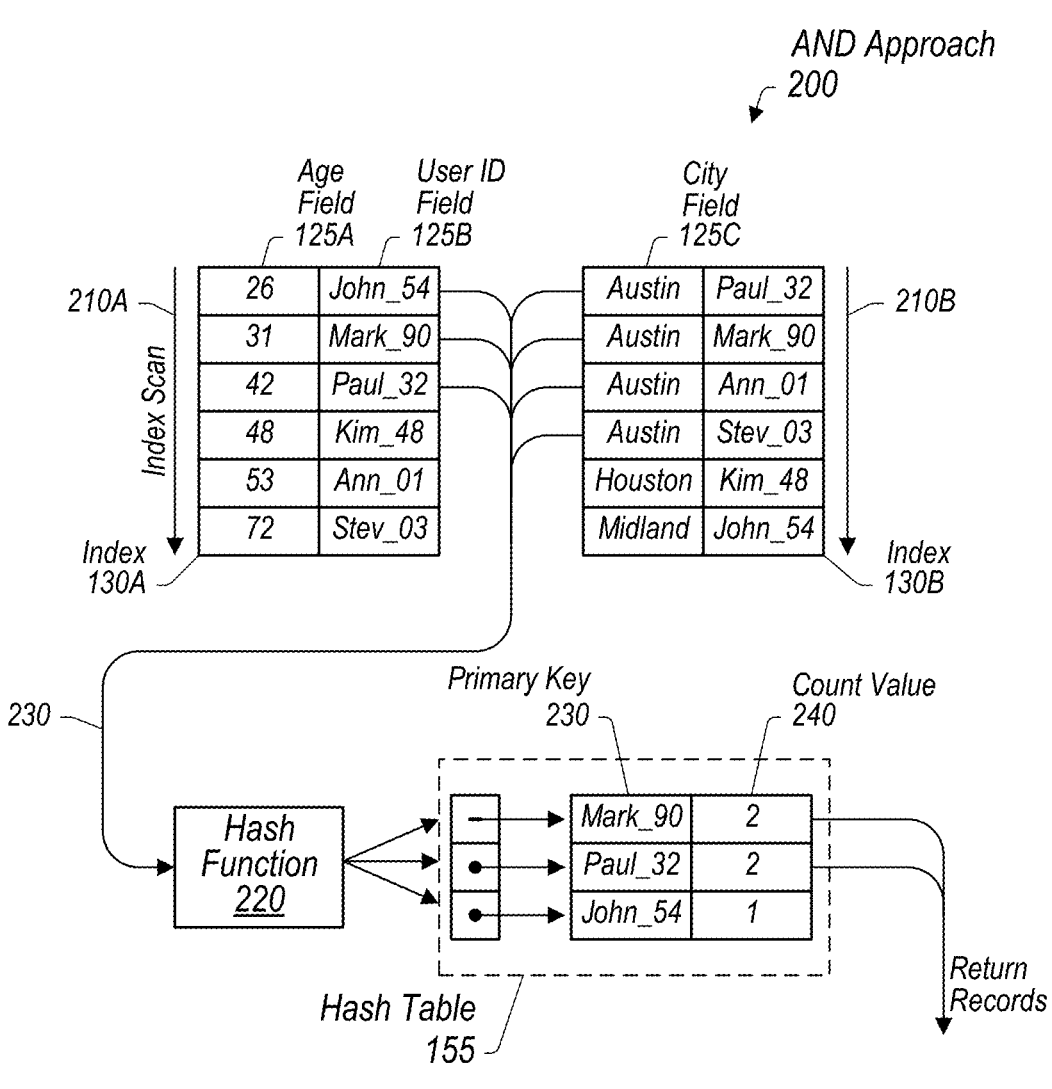
FIG. 2 is a block diagram illustrating example elements of an AND approach in which records are identified that satisfy a set of clauses joined by a set of AND operations, according to some embodiments.

Turning now to FIG. 2, a block diagram of an example AND approach 200 is shown. In the illustrated embodiment, there are two indexes 130A and 130B, a hash table 155, and a hash function 220. Indexes 130A-B are created based on the same table 120, which includes at least three fields: an age field 125A, a user ID field 125B, and a city field 125C. User ID field 125B may correspond to the primary key field of that table 120. As shown, index 130A includes the values (from records in the table 120) that correspond to age field 125A and user ID field 125B, and index 130B includes the values of those records that correspond to city field 125C and user ID field 125B. The illustrated embodiment may be implemented differently than shown. For example, there may be more than two indexes 130, indexes 130A and 130B may store values for more fields 125, and indexes 130A and 130B may store different types of fields 125.

In order to facilitate the following discussion, it is assumed that the database statement 170 "SELECT*FROM table 120 WHERE age <45 AND city=Austin" was received by database server 140. Database server 140, however, can receive different database statements 170 having different Boolean expressions 175. In various embodiments, in order to process that database statement 170, AND engine 150 performs an index scan 210A on index 130A (which corresponds to the age <45 clause) and an index scan 210B on index 130B (which corresponds to the city=Austin clause). In some embodiments, AND engine 150 selects one of those index scans 210 to be the first index scan 210 that will be used to establish hash table 155.

Hash table 155, in various embodiments, is a data structure that stores key-value pairs, where a given value can be accessed based on a hash of its corresponding key. Hash function 220, in various embodiments, implements a hashing algorithm that receives a key value (e.g., a primary key 230) as input and produces information (e.g., an index value) used to access the entry of hash table 155 that includes the set of values associated with that key value. In various embodiments, primary keys 230 may be used as the key values. As expressed, in the illustrated example, the values of user ID field 125B serve as primary keys 230 and thus can be hashed, via hash function 220, to select entries in hash table 155. As an example, the value "Mark_90" is hashed to identify the first entry of hash table 155, which stores the value "Mark_90" and a count value 240. In some embodiments, primary keys 230 are not stored in the entries of hash table 155.

To reduce the number of entries included in hash table 155 and thus the overall memory size of hash table 155, in various embodiments, AND engine 150 performs first the index scan 210 that is estimated to identify the least number of entries in the scanned index 130 that satisfy the condition associated with that index scan 210. That estimation may be based on historical data or a statistical analysis. In some cases, the estimation may be incorrect and the index scan 210 that is estimated to identify the least number of entries actually identifies more entries than another index scan 210. As depicted, three entries of index 130A are identified as part of index scan 210A and four entries of index 130B are identified as part of index scan 210B. Because index scan 210A identifies less entries, index scan 210A may be performed first before index scan 210B. In various embodiments, for each entry identified in the first index scan 210, AND engine 150 populates hash table 155 with an associated entry that includes a count value 240 initialized to a default value, such as 1. For each entry identified in a subsequent index scan 210, the count value of its associated entry (if there is one) is incremented. Consequently, performing index scan 210A before index scan 210B may result in hash table 155 having three entries instead of four entries and therefore less memory space may be consumed by hash table 155.

As explained, as part of performing index scan 210A, index 130A is scanned to identify entries that satisfy the clause (e.g., age <45) of index scan 210A. In various embodiments, an index scan 210 does not have to scan all the entries of an index 130 but instead it can start at a particular entry and proceed until an entry is identified that does not satisfy the clause. Because index 130A is sorted based on age, index scan 210A may start at the initial entry of index 130A and proceed until an entry is located where the age value is greater than 45 at which point index scan 210A can stop scanning. In the case that index scan 210A is performed first, an entry may be created in hash table 155 for each entry identified as satisfying the clause of index scan 210A. Accordingly, as shown, hash table 155 is populated (by AND engine 150) with an entry for user "Mark_90," user "Paul_32," and user "John_54," each of which is associated with a count value 240. That count value may be initialized to a default value, such as one.

As part of performing index scan 210B, index 130B is scanned to identify entries that satisfy the clause (e.g., city=Austin) of index scan 210B. In the case that index scan 210B is performed subsequently, for each entry identified as satisfying the clause of index scan 210B, its corresponding count value 240 (if there is one) is incremented. As shown for example, since the entries that include "Mark_90" and "Paul_32" satisfy the clause, the count values 240 that map to those entries are incremented. In particular, AND engine 150 may identify an entry that satisfies the clause, execute hash function 220 on a value of that entry (e.g., the value of user ID field 125B) to generate an index value identifying an entry included in hash table 155, and then may increment the count value 240 of that identified entry. While the entries that include "Ann_01" and "Stev_03" satisfy the clause, they do not have associated entries in hash table 155 and thus there are no count values 240 to increment for those entries.

The terms "increment" and "decrement" can be understood to encompass their common meanings, which as applied to a counter value respectively connote addition to and subtraction of a value (e.g., 1) from the counter value. It is contemplated, however, that equivalent counter behavior could be implemented using different arithmetic operations. For example, a counter could be implemented using negative values (e.g., 2's complement binary integers) such that "incrementing" the counter could involve subtraction rather than addition, and "decrementing" the counter could involve addition rather than subtraction. Accordingly, the terms "increment" and "decrement" should be understood to more generally encompass activities that respectively move a counter away from and towards an initial value (e.g., 0), regardless of whether the direction of counter movement is positive or negative.

In various embodiments, at the end of all index scans 210, records are returned for only those primary keys 230 whose count 240 is equal to the number of index scans 210 performed by AND engine 150. AND engine 150 may determine which entries of hash table 155 have a sufficient count value 240 and then may use their primary keys 230 to access the actual records of the corresponding table 120. Those records might then be returned to the requestor. For the illustrated embodiment, two index scans 210 are performed and therefore only the records that correspond to "Mark_90" and "Paul_32" may be returned as their count value 240 is equal to two.

Figure 3:
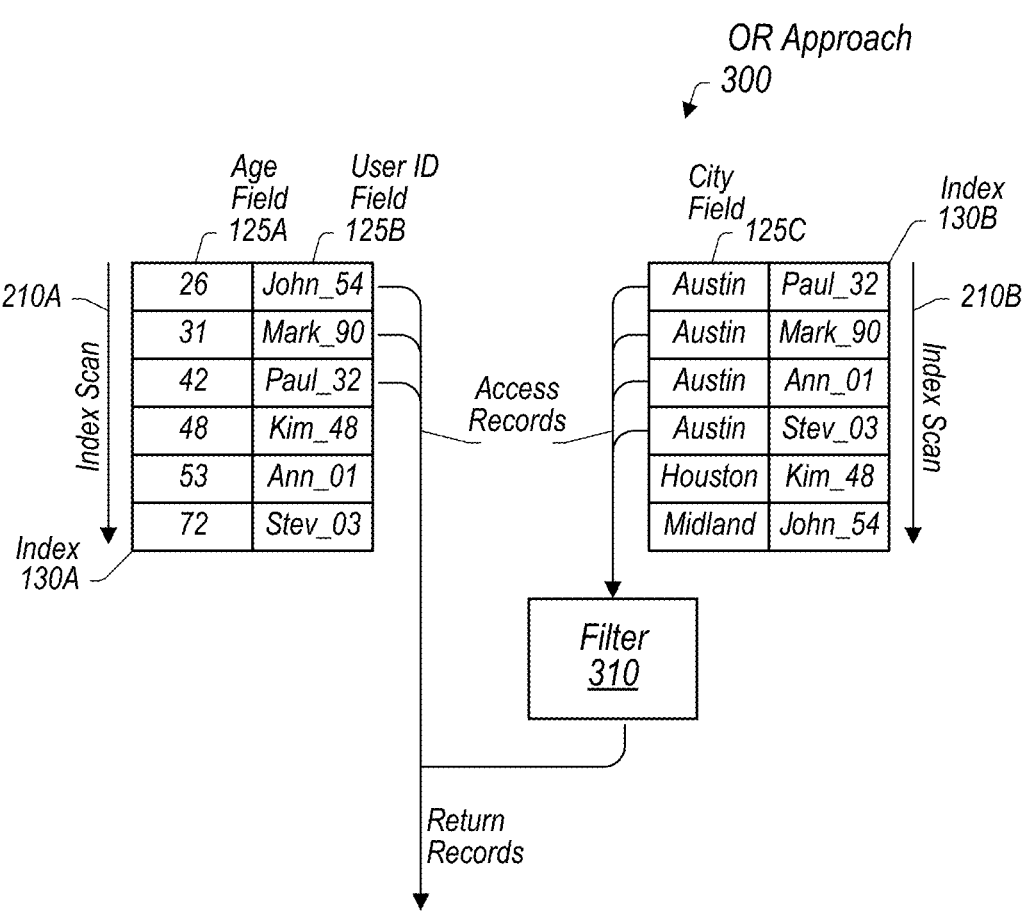
FIG. 3 is a block diagram illustrating example elements of a filter-based OR approach in which records are identified that satisfy a set of clauses joined by a set of OR operations, according to some embodiments.

Turning now to FIG. 3, a block diagram of an example OR approach 300 is shown. In the illustrated embodiment, there are two indexes 130A and 130B and a filter 310. Similarly to FIG. 2, indexes 130A-B include at least three fields: age field 125A, user ID field 125B, and city field 125C. As depicted, index 130A includes the values (from records in a table 120) that correspond to age field 125A and user ID field 125B while index 130B includes the values of those same records that correspond to city field 125C and user ID field 125B. The illustrated embodiment may be implemented differently than shown. As an example, there may be more indexes 130, indexes 130A-B may store values for more fields 125, and indexes 130A-B may store different types of fields 125.

In order to facilitate the following discussion, it is assumed that the database statement 170 "SELECT*FROM table 120 WHERE age <45 OR city=Austin" was received by database server 140; however, different database statements 170 having different Boolean expressions 175 may be received. In various embodiments, in order to process that database statement 170, OR engine 160 performs an index scan 210A on index 130A (which corresponds to the age <45 clause) and an index scan 210B on index 130B (which corresponds to the city=Austin clause). In OR approach 300, OR engine 160 may perform a set of index scans 210 in which each subsequent index scan 210 involves a filter 310 that defines a negative clause pertaining to the clauses of the prior index scans 210. Consider the case in which index scan 210B is performed after index scan 210A. For index scan 210A, OR engine 160 may identify index entries within index 130A that satisfy the condition of the clause of "age <45." In response to identifying an index entry, OR engine 160 may access the corresponding record of table 120 and return it to the requestor. For index scan 210B, OR engine 160 may augment the clause "city=Austin" with a negative clause of the clause of index scan 210A (i.e., "(age <45) IS NOT TRUE"). By augmenting a subsequent index scan 210 with the negation of the clauses of prior index scans 210, OR engine 160 may ensure that duplicate records are not returned. Accordingly, in response to identifying an index entry of index 130B, OR engine 160 may access the corresponding record and determine if the record stores a value that satisfies the clause "(age <45) IS NOT TRUE" (i.e., its value for age field 125A is >=45 or NULL). If the record satisfies all clauses, then it may be returned; otherwise, OR engine 160 may proceed with the index scan 210B. In some embodiments, OR engine 160 unions the results of all the relevant index scans 210 before returning the records to the requestor.

Figure 4:
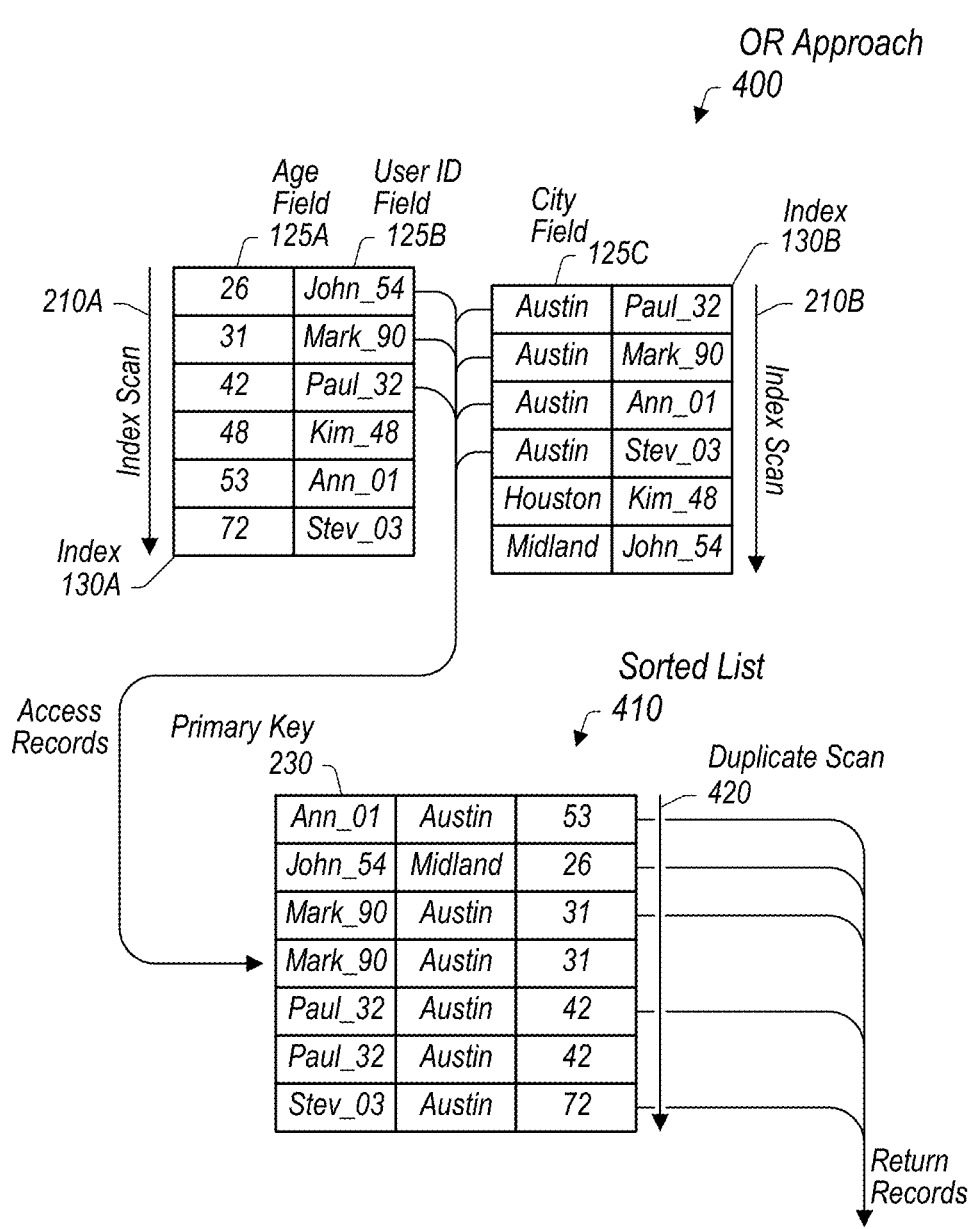
FIG. 4 is a block diagram illustrating example elements of a list-based OR approach in which records are identified that satisfy a set of clauses joined by a set of OR operations, according to some embodiments.

Turning now to FIG. 4, a block diagram of an example OR approach 400 is shown. In the illustrated embodiment, there are two indexes 130A and 130B. Similarly to FIGS. 2 and 3, indexes 130A-B include at least three fields: age field 125A, user ID field 125B, and city field 125C. As shown, index 130A includes the values (from records in a table 120) that correspond to age field 125A and user ID field 125B while index 130B includes the values of those same records that correspond to city field 125C and user ID field 125B. The illustrated embodiment may be implemented differently than shown. As an example, there may be more indexes 130, indexes 130A-B may store values for more fields 125, and indexes 130A-B may store different types of fields 125.

To facilitate the following discussion, it is again assumed that the database statement 170 "SELECT*FROM table 120 WHERE age <45 OR city=Austin" was received by database server 140, although different database statements 170 having different Boolean expressions 175 may be received. In various embodiments, in order to process that database statement 170, OR engine 160 performs an index scan 210A on index 130A (which corresponds to the age <45 clause) and an index scan 210B on index 130B (which corresponds to the city=Austin clause). As part of performing index scan 210A or 210B, OR engine 160 identifies index entries satisfying the condition of the clause of the corresponding index scan 210. In response to identifying an index entry that satisfies the clause, in various embodiments, OR engine 160 accesses the associated record. As an example, OR engine 160 may determine, for index scan 210A, that the first entry of index 130A satisfies the clause "age <45" and thus may use the value of user ID field 125A (i.e., "John_54") to access the associated record from the corresponding table 120. As shown, three entries of index 130A satisfy the clause "age <45" and four entries of index 130B satisfy the clause "city=Austin" and thus seven records are accessed—OR engine 160 may union all records returned from those index scans 210.

In some cases, in order to remove duplicate records so that a record is returned at most once, the records that are accessed for the index scans 210 of the OR operation are sorted based on their primary key 230 to produce a sorted list 410. As shown, the seven records accessed as part of index scans 210A-B are sorted based on their value provided for user ID field 125B. In various embodiments, after sorting the accessed records, OR engine 160 performs a duplicate scan 420 in which it traverses sorted list 410 and returns the first occurrence of a given instance of a record. That is, the records are sorted based on their primary keys 230 to generate sorted list 410 and then a scan is performed on sorted list 410 to return each distinct record (based on primary keys 230) exactly once. As depicted for example, there are two records with the set of values "Mark_90," "Austin," and "31." Only one of those two records is returned. By sorting based on primary keys 230, OR engine 160 may group duplicate records so that when it scans sorted list 410, it may determine whether to return an instance of a record (e.g., by comparing the previous primary key 230 with the primary key 230 of the record being considered) without tracking whether an instance of that record has already been returned. In some embodiments, sorting to remove duplicates could happen before accessing the base records if there are no filtering conditions on non-index columns.

Figure 5:
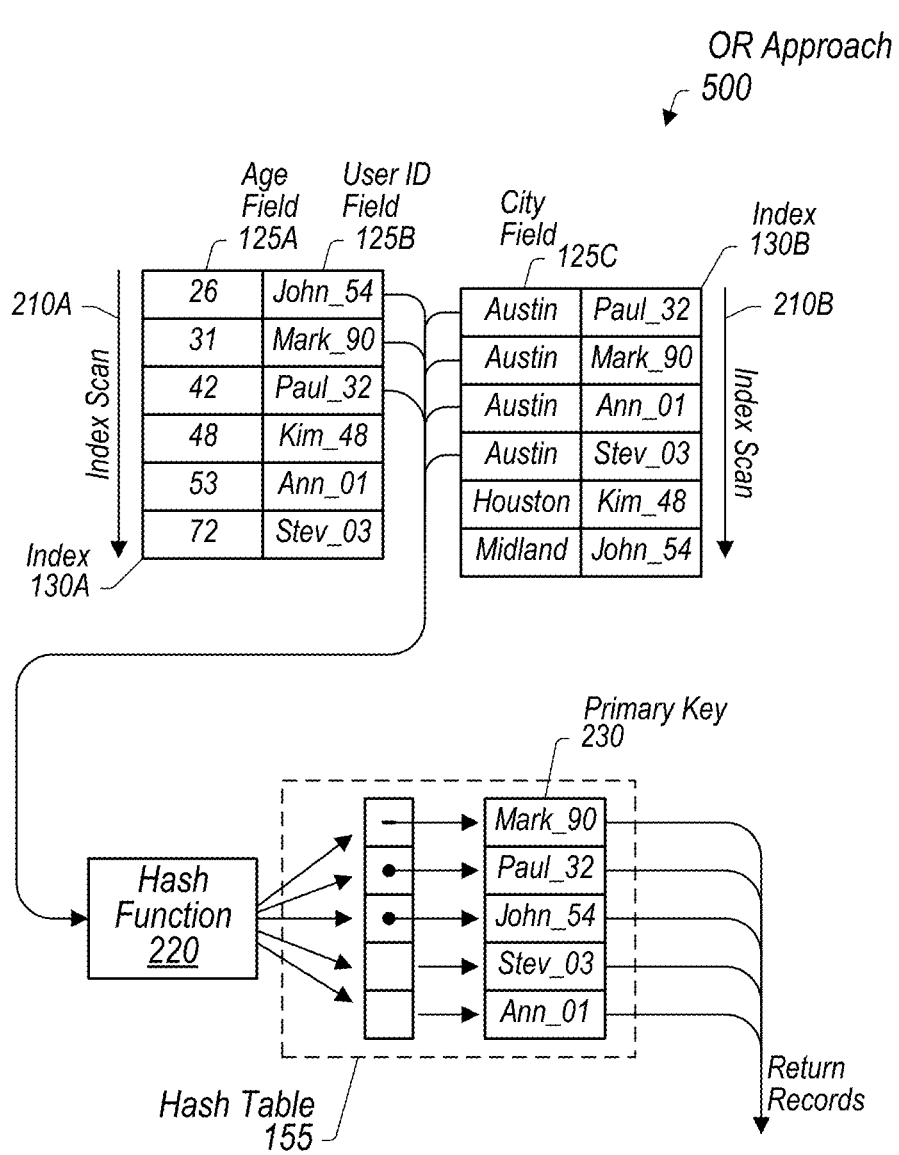
FIG. 5 is a block diagram illustrating example elements of a hash table-based OR approach in which records are identified that satisfy a set of clauses joined by a set of OR operations, according to some embodiments.

Turning now to FIG. 5, a block diagram of an example OR approach 500 is shown. In the illustrated embodiment, there are two indexes 130A and 130B and hash table 155. Similarly to FIGS. 2-4, indexes 130A-B include at least three fields: age field 125A, user ID field 125B, and city field 125C. As shown, index 130A includes the values (from records in a table 120) that correspond to age field 125A and user ID field 125B while index 130B includes the values of those same records that correspond to city field 125C and user ID field 125B. The illustrated embodiment may be implemented differently than shown. As an example, there may be more indexes 130, indexes 130A-B may store values for more fields 125, and indexes 130A-B may store different types of fields 125.

To facilitate the following discussion, it is again assumed that the database statement 170 "SELECT*FROM table 120 WHERE age <45 OR city=Austin" was received by database server 140, although different database statements 170 having different Boolean expressions 175 may be received. As previously explained, OR engine 160 may perform an index scan 210A on index 130A and an index scan 210B on index 130B. As part of performing index scan 210A or 210B, OR engine 160 identifies index entries satisfying the condition of the clause of the associated index scan 210. In response to identifying an index entry that satisfies the relevant clause, in various embodiments, OR engine 160 hashes a value of that entry (e.g., the value provided for user ID field 125B) using hash function 220 to identify an entry in hash table 155. If no value is stored in that entry, then OR engine 160 may access the record that corresponds to the index entry and return it to the requestor. OR engine 160 may also store the primary key 230 within the identified entry of hash table 155. As such, if a value is stored in the entry, then OR engine 160 may not access and return the corresponding entry but rather proceed with the index scan 210. That is, OR engine 160 may insert results from index scans 210 into hash table 155 using the primary keys 230 of the results as hash keys, and then return each record identified by hash table 155. The records may be returned as soon as new hash keys are seen.

Turning now to FIG. 6, a flow diagram of a method 600 is shown. Method 600 is one embodiment of a method performed by a computer system (e.g., system 100) to access a set of records (e.g., records 174) of a database table (e.g., a table 120) using multiple indexes (e.g., indexes 130). Method 600 may be performed by executing a set of program instructions stored on a non-transitory computer-readable medium. In some embodiments, method 600 includes more or less steps than shown. As an example, method 600 might include a step in which the computer system performs a set of index scans for clauses that are joined by OR operations.

Method 600 begins in step 610 with the computer system storing: a database table that comprises a plurality of fields (e.g., fields 125), and a plurality of indexes that correspond to at least two of the plurality of fields. In step 620, the computer system receives a request (e.g., a transaction request 172) to access a set of records included in the database table. The request may specify a Boolean expression (e.g., a Boolean expression 175) that affects a selection of records from the database table and that comprises a plurality of clauses (e.g., city=New York and age >45), at least two of which are joined by an AND operation. In various embodiments, the records stored in the database table are not associated with corresponding row identifiers.

In step 630, the computer system accesses the set of records. As part of accessing those records, in step 632, the computer system performs, for a given one of the at least two clauses joined by the AND operation, an index scan (e.g., an index scan 210) on one of the plurality of indexes that corresponds to the given clause in order to identify records that satisfy the given clause—the accessing includes performing a plurality of index scans. In various embodiments, the computer system determines an index scan that is estimated to return the least number of records of the plurality of index scans and performs that index scan first. The accessing may be performed without using bitmaps.

In various cases, the plurality of clauses includes at least two clauses that are joined by an OR operation. Accordingly, the accessing may include performing index scans on indexes of the plurality of indexes that correspond to the at least two clauses that are joined by the OR operation. A first index scan of the index scans may return records that satisfy a first clause while a second index scan of the index scans returns records that satisfy a second clause but not the first clause. The computer system may aggregate records that are returned by the index scans to derive at least a portion of the requested set of records. In some cases, the computer system aggregates records that are returned by index scans and updates a hash table based on those aggregated records. The computer system may then select records identified by the hash table to derive at least a portion of the requested set of records. In some cases, the computer system sorts the aggregated records according to primary key and then scans the sorted records in order to select one record for each unique primary key of the sorted records.

In step 634, the computer system updates a hash table (e.g., a hash table 155) based on the identified records. The updating of the hash table may include, for an initial identification of a record in the plurality of index scans, the computer system determining a primary key (e.g., a primary key 230) based on the record and populating, based on the primary key, the hash table with an entity identifying a count value (e.g., a count value 240) corresponding to the record. For a subsequent identification of the record in the index scans, the computer system may update the count value corresponding to the record.

In step 636, the computer system identifies the requested set of records based on the hash table and returns them. The identification may include the computer system determining. from the hash table, a set of primary keys (e.g., primary keys 230) associated with a particular count value that satisfies a defined condition (e.g., the count value being equal to the number of plurality of index scans). The computer system may access the set of records based on the set of primary keys.

Figure 7:
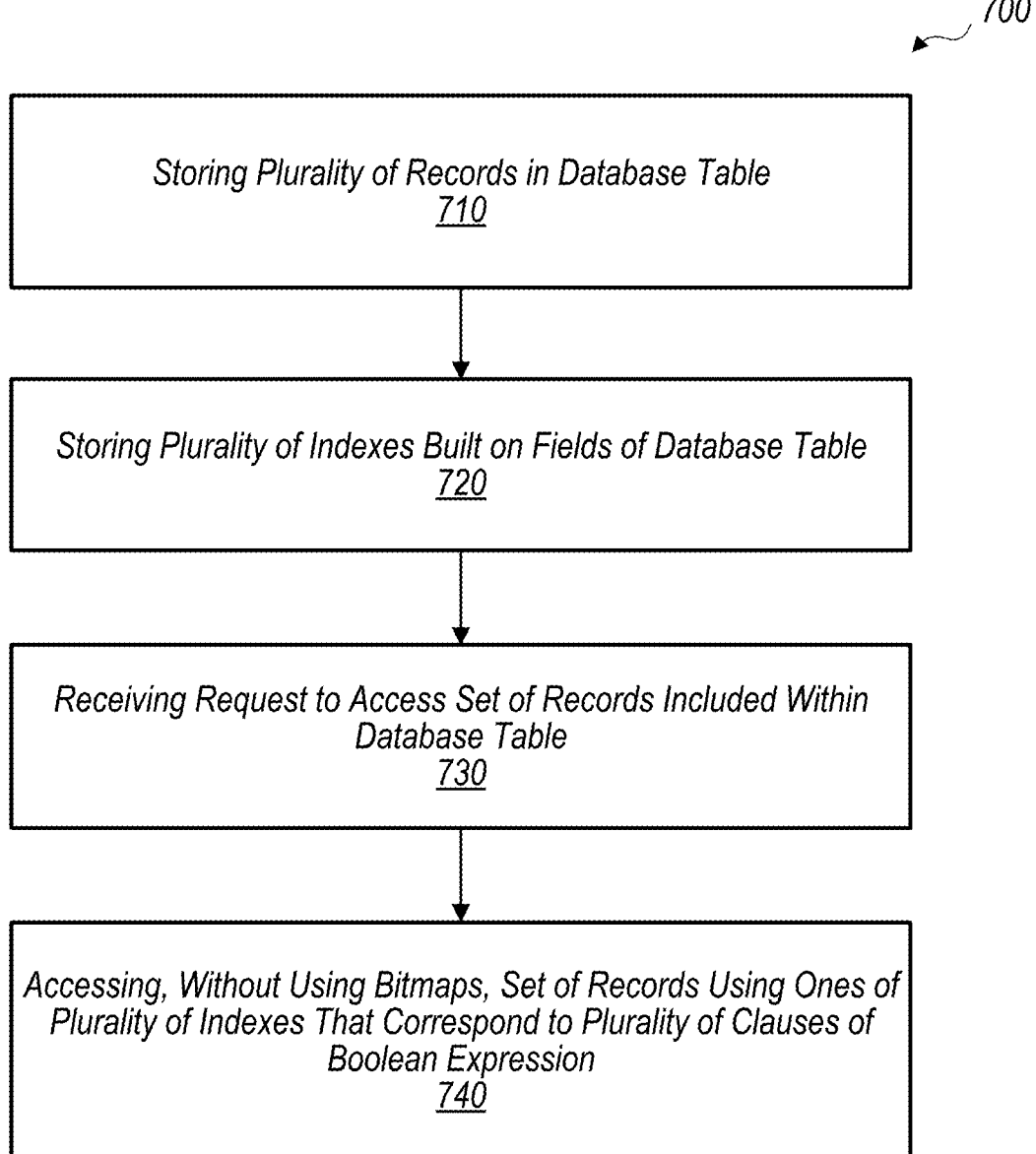

Turning now to FIG. 7, a flow diagram of a method 700 is shown. Method 700 is one embodiment of a method performed by a computer system (e.g., system 100) to access a set of records (e.g., records 174) of a database table (e.g., a table 120) using multiple indexes (e.g., indexes 130). Method 700 may be performed by executing a set of program instructions stored on a non-transitory computer-readable medium. In some embodiments, method 700 includes more or less steps than shown. As an example, method 700 might include a step in which the computer system performs a set of index scans for clauses that are joined by OR operations.

Method 700 begins in step 710 with the computer system storing a plurality of records in the database table. The plurality of records may not include respective row identifiers. In step 720, the computer system stores a plurality of indexes built on fields (e.g., fields 125) of the database table. In step 730, the computer system receives a request (e.g., a transaction request 172) to access a set of records included in the database table. The request may specify a Boolean expression (e.g., a Boolean expression 175) that affects a selection of records from the database table and that comprises a plurality of clauses, which may include at least one AND operation and at least one OR operation.

In step 740, the computer system accesses, without using bitmaps, the set of records using ones of the plurality of indexes that correspond to the plurality of clauses of the Boolean expression. At least two of the plurality of clauses may be joined by an AND operation. The accessing may include, for a given one of the at least two clauses joined by the AND operation, performing an index scan on one of the plurality of indexes that corresponds to the given clause to identify records that satisfy the given clause. The computer system may update a hash table based on the identified records and determine at least a portion of the requested set of records based on the hash table. A record of the at least a portion of the requested set of records may be determined based on the hash table indicating that the record was accessed in each of the plurality of index scans.

At least two of the plurality of clauses may be joined by an OR operation. Accordingly, the accessing may include performing index scans on indexes of the plurality of indexes that correspond to the at least two clauses that are joined by the OR operation. A first index scan of the index scans may return records that satisfy a first clause while a second index scan of the index scans returns records satisfying a second clause but not the first clause. The computer system may aggregate records that are returned by the index scans to derive at least a portion of the requested set of records.

*Exemplary Multi-Tenant Database System*

Figure 8:
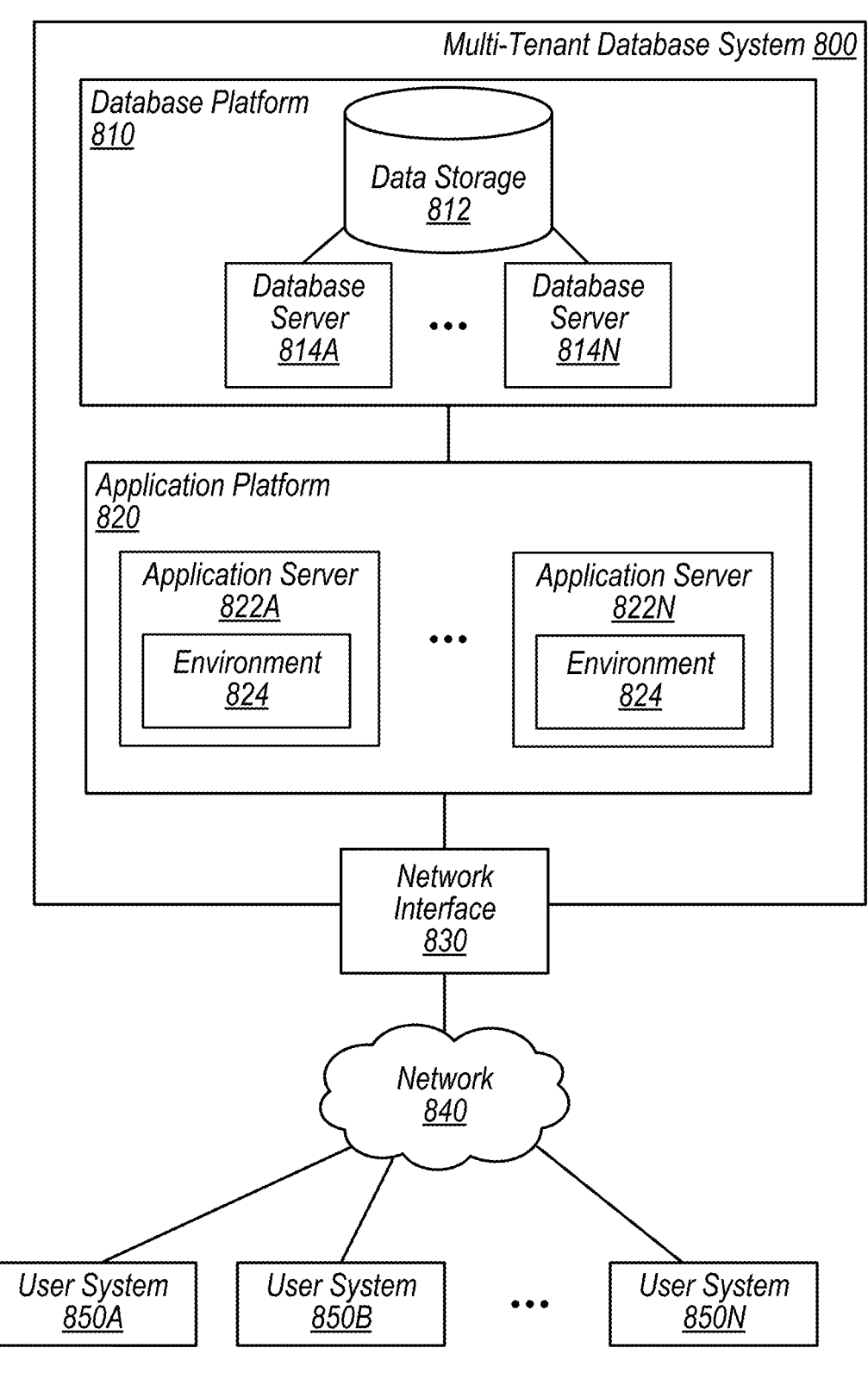
FIG. 8 is a block diagram illustrating elements of a multi-tenant system, according to some embodiments.

Turning now to FIG. 8, an exemplary multi-tenant database system (MTS) 800 in which various techniques of the present disclosure can be implemented is shown—e.g., system 100 may be MTS 800. In FIG. 8, MTS 800 includes a database platform 810, an application platform 820, and a network interface 830 connected to a network 840. Also as shown, database platform 810 includes a data storage 812 and a set of database servers 814A-N that interact with data storage 812, and application platform 820 includes a set of application servers 822A-N having respective environments 824. In the illustrated embodiment, MTS 800 is connected to various user systems 850A-N through network 840. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 800, in various embodiments, is a set of computer systems that together provide various services to users (alternatively referred to as "tenants") that interact with MTS 800. In some embodiments, MTS 800 implements a customer relationship management (CRM) system that provides mechanism for tenants (e.g., companies, government bodies, etc.) to manage their relationships and interactions with customers and potential customers. For example, MTS 800 might enable tenants to store customer contact information (e.g., a customer's website, email address, telephone number, and social media data), identify sales opportunities, record service issues, and manage marketing campaigns. Furthermore, MTS 800 may enable those tenants to identify how customers have been communicated with, what the customers have bought, when the customers last purchased items, and what the customers paid. To provide the services of a CRM system and/or other services, as shown, MTS 800 includes a database platform 810 and an application platform 820.

Database platform 810, in various embodiments, is a combination of hardware elements and software routines that implement database services for storing and managing data of MTS 800, including tenant data. As shown, database platform 810 includes data storage 812. Data storage 812, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 812 is used to implement a database (e.g., database 110) comprising a collection of information that is organized in a way that allows for access, storage, and manipulation of the information. Data storage 812 may implement a single database, a distributed database, a collection of distributed databases, a database with redundant online or offline backups or other redundancies, etc. As part of implementing the database, data storage 812 may store files that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 800 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 812 is organized as part of a log-structured merge-tree (LSM tree). An LSM tree normally includes two high-level components: an in-memory buffer and a persistent storage. In operation, a database server 814 may initially write database records into a local in-memory buffer before later flushing those records to the persistent storage (e.g., data storage 812). As part of flushing database records, the database server 814 may write the database records into new files that are included in a "top" level of the LSM tree. Over time, the database records may be rewritten by database servers 814 into new files included in lower levels as the database records are moved down the levels of the LSM tree. In various implementations, as database records age and are moved down the LSM tree, they are moved to slower and slower storage devices (e.g., from a solid state drive to a hard disk drive) of data storage 812.

When a database server 814 wishes to access a database record for a particular key, the database server 814 may traverse the different levels of the LSM tree for files that potentially include a database record for that particular key.

If the database server 814 determines that a file may include a relevant database record, the database server 814 may fetch the file from data storage 812 into a memory of the database server 814. The database server 814 may then check the fetched file for a database record having the particular key. In various embodiments, database records are immutable once written to data storage 812. Accordingly, if the database server 814 wishes to modify the value of a row of a table (which may be identified from the accessed database record), the database server 814 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 814, in various embodiments, are hardware elements, software routines, or a combination thereof capable of providing database services, such as data storage, data retrieval, and/or data manipulation. A database server 814 may correspond to database server 140. Such database services may be provided by database servers 814 to components (e.g., application servers 822) within MTS 800 and to components external to MTS 800. As an example, a database server 814 may receive a database transaction request from an application server 822 that is requesting data to be written to or read from data storage 812. The database transaction request may specify an SQL SELECT command to select one or more rows from one or more database tables. The contents of a row may be defined in a database record and thus database server 814 may locate and return one or more database records that correspond to the selected one or more table rows. In various cases, the database transaction request may instruct database server 814 to write one or more database records for the LSM tree—database servers 814 maintain the LSM tree implemented on database platform 810. In some embodiments, database servers 814 implement a relational database management system (RDMS) or object oriented database management system (OODBMS) that facilitates storage and retrieval of information against data storage 812. In various cases, database servers 814 may communicate with each other to facilitate the processing of transactions. For example, database server 814A may communicate with database server 814N to determine if database server 814N has written a database record into its in-memory buffer for a particular key.

Application platform 820, in various embodiments, is a combination of hardware elements and software routines that implement and execute CRM software applications as well as provide related data, code, forms, web pages and other information to and from user systems 850 and store related data, objects, web page content, and other tenant information via database platform 810. In order to facilitate these services, in various embodiments, application platform 820 communicates with database platform 810 to store, access, and manipulate data. In some instances, application platform 820 may communicate with database platform 810 via different network connections. For example, one application server 822 may be coupled via a local area network and another application server 822 may be coupled via a direct network link. Transfer Control Protocol and Internet Protocol (TCP/IP) are exemplary protocols for communicating between application platform 820 and database platform 810, however, it will be apparent to those skilled in the art that other transport protocols may be used depending on the network interconnect used.

Application servers 822, in various embodiments, are hardware elements, software routines, or a combination thereof capable of providing services of application platform 820, including processing requests received from tenants of MTS 800. Application servers 822, in various embodiments, can spawn environments 824 that are usable for various purposes, such as providing functionality for developers to develop, execute, and manage applications (e.g., business logic). Data may be transferred into an environment 824 from another environment 824 and/or from database platform 810. In some cases, environments 824 cannot access data from other environments 824 unless such data is expressly shared. In some embodiments, multiple environments 824 can be associated with a single tenant.

Application platform 820 may provide user systems 850 access to multiple, different hosted (standard and/or custom) applications, including a CRM application and/or applications developed by tenants. In various embodiments, application platform 820 may manage creation of the applications, testing of the applications, storage of the applications into database objects at data storage 812, execution of the applications in an environment 824 (e.g., a virtual machine of a process space), or any combination thereof. In some embodiments, application platform 820 may add and remove application servers 822 from a server pool at any time for any reason, there may be no server affinity for a user and/or organization to a specific application server 822. In some embodiments, an interface system (not shown) implementing a load balancing function (e.g., an F5 Big-IP load balancer) is located between the application servers 822 and the user systems 850 and is configured to distribute requests to the application servers 822. In some embodiments, the load balancer uses a least connections algorithm to route user requests to the application servers 822. Other examples of load balancing algorithms, such as are round robin and observed response time, also can be used. For example, in certain embodiments, three consecutive requests from the same user could hit three different servers 822, and three requests from different users could hit the same server 822.

In some embodiments, MTS 800 provides security mechanisms, such as encryption, to keep each tenant's data separate unless the data is shared. If more than one server 814 or 822 is used, they may be located in close proximity to one another (e.g., in a server farm located in a single building or campus), or they may be distributed at locations remote from one another (e.g., one or more servers 814 located in city A and one or more servers 822 located in city B). Accordingly, MTS 800 may include one or more logically and/or physically connected servers distributed locally or across one or more geographic locations.

One or more users (e.g., via user systems 850) may interact with MTS 800 via network 840. User system 850 may correspond to, for example, a tenant of MTS 800, a provider (e.g., an administrator) of MTS 800, or a third party. Each user system 850 may be a desktop personal computer, workstation, laptop, PDA, cell phone, or any Wireless Access Protocol (WAP) enabled device or any other computing device capable of interfacing directly or indirectly to the Internet or other network connection. User system 850 may include dedicated hardware configured to interface with MTS 800 over network 840. User system 850 may execute a graphical user interface (GUI) corresponding to MTS 800, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 850 to access, process, and view information and pages available to it from MTS 800 over network 840. Each user system 850 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 800 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 850 may be users in differing capacities, the capacity of a particular user system 850 might be determined one or more permission levels associated with the current user. For example, when a salesperson is using a particular user system 850 to interact with MTS 800, that user system 850 may have capacities (e.g., user privileges) allotted to that salesperson. But when an administrator is using the same user system 850 to interact with MTS 800, the user system 850 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 800 that are allocated at the tenant level while other data structures are managed at the user level.

In some embodiments, a user system 850 and its components are configurable using applications, such as a browser, that include computer code executable on one or more processing elements. Similarly, in some embodiments, MTS 800 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 840 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 850 may communicate with MTS 800 using TCP/IP and, at a higher network level, use other common Internet protocols to communicate, such as HTTP, FTP, AFS, WAP, etc. For example, where HTTP is used, user system 850 might include an HTTP client commonly referred to as a "browser" for sending and receiving HTTP messages from an HTTP server at MTS 800. Such a server might be implemented as the sole network interface between MTS 800 and network 840, but other techniques might be used as well or instead. In some implementations, the interface between MTS 800 and network 840 includes load sharing functionality, such as round-robin HTTP request distributors to balance loads and distribute incoming HTTP requests evenly over a plurality of servers.

In various embodiments, user systems 850 communicate with application servers 822 to request and update system-level and tenant-level data from MTS 800 that may require one or more queries to data storage 812. In some embodiments, MTS 800 automatically generates one or more SQL statements (the SQL query) designed to access the desired information. In some cases, user systems 850 may generate requests having a specific format corresponding to at least a portion of MTS 800. As an example, user systems 850 may request to move data objects into a particular environment 824 using an object notation that describes an object relationship mapping (e.g., a JavaScript object notation mapping) of the specified plurality of objects.

Exemplary Computer System

Figure 9:
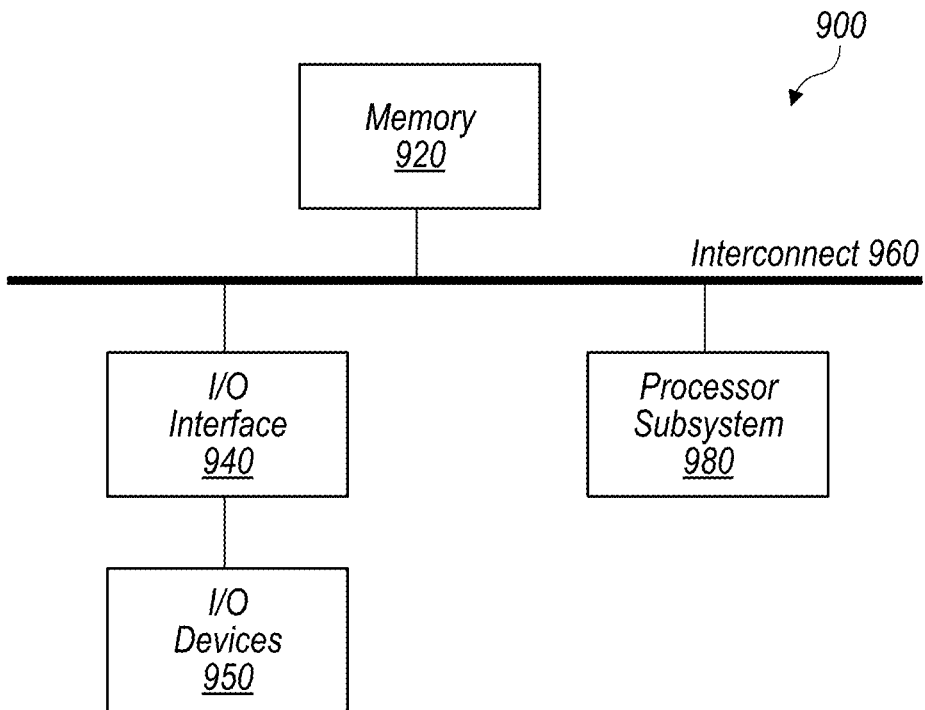
FIG. 9 is a block diagram illustrating elements of a computer system for implementing various systems described in the present disclosure, according to some embodiments.

Turning now to FIG. 9, a block diagram of an exemplary computer system 900, which may implement system 100, database 110, database server 140, MTS 800, and/or user system 850, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 900 is not limited to primary storage such as memory

920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980. In some embodiments, program instructions that when executed implement AND engine 150 and/or OR engine 160 may be included/stored within system memory 920.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
a computer system storing:
    a database table comprising a plurality of fields; and
    a plurality of indexes corresponding to at least two of the plurality of fields;
the computer system receiving a request to access a set of records included in the database table, wherein the request specifies a Boolean expression that affects a selection of records from the database table and comprises a plurality of clauses, at least two of which are joined by an OR operation; and
the computer system accessing the set of records, wherein the accessing includes:
    performing index scans on ones of the plurality of indexes that correspond to the at least two clauses joined by the OR operation, wherein a first index scan of the index scans returns records that satisfy a first clause and a second index scan of the index scans returns particular records that satisfy a second clause but do not satisfy the first clause, the particular records not including duplicates of the records returned by the first index scan; and
    aggregating results returned from the index scans to derive at least a portion of the requested set of records; and
the computer system returning the requested set of records to an issuer of the request.

2. The method of claim 1, wherein the aggregating of the results includes performing union operations between sets of records that are returned from the index scans to derive the portion of the requested set of records.

3. The method of claim 1, wherein a third index scan of the index scans returns records that satisfy a third clause of the plurality of clauses but do not satisfy the first and second clauses.

4. The method of claim 1, wherein the plurality of clauses includes at least two clauses that are joined by an AND operation, and wherein the accessing includes:
    for a given one of the at least two clauses joined by the AND operation, performing an index scan on one of the plurality of indexes that corresponds to the given clause to identify records that satisfy the given clause;
    updating a hash table based on the identified records; and
    identifying another portion of the requested set of records based on the hash table.

5. The method of claim 4, further comprising:
    the computer system maintaining, in the hash table, a count value for each unique primary key included in the identified records; and
    the computer system identifying a set of primary keys associated with a count value that matches a number of index scans performed in association with the AND operation, wherein the other portion includes records corresponding to the set of primary keys.

6. The method of claim 1, wherein records stored in the database table are not associated with respective row identifiers.

7. The method of claim 1, wherein the accessing is performed without using bitmaps.

8. A non-transitory computer readable medium having program instructions stored thereon that are capable of causing a computer system to perform operations comprising:
    storing a database table comprising a plurality of fields;
    storing a plurality of indexes corresponding to at least two of the plurality of fields;
    receiving a request to access a set of records included within the database table, wherein the request specifies a Boolean expression that affects a selection of records from the database table and comprises a plurality of clauses, at least two of which are joined by an OR operation; and
    accessing the set of records, wherein the accessing includes:
        performing index scans on ones of the plurality of indexes that correspond to the at least two clauses joined by the OR operation, wherein a first index scan of the index scans returns records that satisfy a first clause and a second index scan of the index scans returns records that satisfy a second clause; and
        aggregating results returned from the index scans to derive at least a portion of the requested set of records, wherein the aggregating includes:
            performing a union operation between the records returned from the first index scan and the records returned from the second index scan to produce an aggregated set of records; and
            removing duplicate records from the aggregated set of records to derive the portion of the requested set of records; and
    returning the requested set of records to an issuer of the request.

9. The non-transitory computer readable medium of claim 8, wherein the removing of the duplicate records includes sorting the aggregated set of records by primary key to derive a sorted list and traversing the sorted list to identify the duplicate records.

10. The non-transitory computer readable medium of claim 8, wherein the plurality of clauses includes at least two clauses joined by an AND operation, and wherein the accessing includes:
    for a given one of the at least two clauses joined by the AND operation, performing an index scan on one of the plurality of indexes that corresponds to the given clause to identify records that satisfy the given clause;
    updating a hash table based on the identified records; and
    identifying another portion of the requested set of records based on the hash table.

11. The non-transitory computer readable medium of claim 10, wherein the operations further comprise:

maintaining, in the hash table, a count value for each unique primary key included in the identified records, wherein a count value for a given primary key indicates a number of occurrences of a record in index scans performed for the at least two clauses joined by the AND operation that includes the given primary key; and determining a set of primary keys associated with a count value that matches a number of index scans performed in association with the AND operation, wherein the other portion is identified based on the set of primary keys.

12. The non-transitory computer readable medium of claim 8, wherein a third index scan of the index scans returns records that satisfy a third clause of the plurality of clauses but do not satisfy the first and second clauses.

13. A system, comprising:

at least one processor; and memory having program instructions stored thereon that are executable by the at least one processor to cause the system to perform operations comprising:

storing a database table comprising a plurality of fields;

storing a plurality of indexes corresponding to at least two of the plurality of fields;

receiving a request to access a set of records included within the database table, wherein the request specifies a Boolean expression that affects a selection of records from the database table and comprises a plurality of clauses, at least two of which are joined by an OR operation; and accessing the set of records, wherein the accessing includes:

performing index scans on ones of the plurality of indexes that correspond to the at least two clauses joined by the OR operation, wherein a first index scan of the index scans returns records that satisfy a first clause and a second index scan of the index scans returns records that satisfy a second clause;

aggregating results returned from the index scans, wherein the aggregating includes performing a union operation between the records returned from the first index scan and the records returned from the second index scan;

updating a first hash table based on the aggregated results; and selecting records identified by the first hash table to derive a portion of the requested set of records; and returning the requested set of records to an issuer of the request.

14. The system of claim 13, wherein a particular index scan of the index scans returns records satisfying one of the at least two clauses joined by the OR operation but do not satisfy the other clauses of the at least two clauses joined by the OR operation.

15. The system of claim 13, wherein at least two of the plurality of clauses are joined by an AND operation, and wherein the accessing includes:

for a given one of the at least two clauses joined by the AND operation, performing an index scan on one of the plurality of indexes that corresponds to the given clause to identify records that satisfy the given clause;

updating a second hash table based on the identified records; and determining another portion of the requested set of records based on the second hash table.

16. The system of claim 15, wherein a record of the other portion is determined based on the second hash table indicating that the record was accessed in each index scan performed for the at least two clauses joined by the AND operation.

* * * * *